US009023556B2

(12) United States Patent
Ji et al.

(10) Patent No.: US 9,023,556 B2
(45) Date of Patent: May 5, 2015

(54) METHOD OF PREPARING GAS DIFFUSION MEDIA FOR A FUEL CELL

(75) Inventors: Chunxin Ji, Pennfield, NY (US);
Gerald J. Fleming, Wolfeboro, NH (US); Margaret Fleming, legal representative, Wolfeboro, NH (US);
Mark Mathias, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2457 days.

(21) Appl. No.: 11/378,224

(22) Filed: Mar. 17, 2006

(65) Prior Publication Data
US 2007/0218343 A1 Sep. 20, 2007

(51) Int. Cl.
*H01M 8/00* (2006.01)
*H01M 8/10* (2006.01)
*H01M 8/02* (2006.01)

(52) U.S. Cl.
CPC .......... *H01M 8/0243* (2013.01); *H01M 8/0234* (2013.01); *H01M 8/0239* (2013.01); *H01M 8/1002* (2013.01); *Y02E 60/521* (2013.01)

(58) Field of Classification Search
USPC .......... 429/42, 44; 502/101; 426/447.2, 449.6
See application file for complete search history.

(56) References Cited

U.S. PATENT DOCUMENTS

| 4,426,470 | A  | * | 1/1984  | Wessling et al. ................. 524/35 |
| 5,648,027 | A  | * | 7/1997  | Tajiri et al. ...................... 264/43 |
| 6,171,720 | B1 | * | 1/2001  | Besmann et al. ............... 429/39 |
| 2003/0143452 | A1 |   | 7/2003  | Ito et al. |
| 2004/0036190 | A1 | * | 2/2004  | Yoshida ........................ 264/105 |
| 2004/0175608 | A1 | * | 9/2004  | Lisi et al. ........................ 429/38 |
| 2005/0058869 | A1 |   | 3/2005  | Mathias et al. |
| 2005/0233203 | A1 | * | 10/2005 | Hampden-Smith et al. .... 429/44 |

FOREIGN PATENT DOCUMENTS

| DE | 19716704 A1   | 12/1997 |
| DE | 10303431 A1   | 8/2003  |
| DE | 10342199 A1   | 4/2005  |
| GB | 2313561 A     | 12/1997 |
| JP | 8-002979      | 1/1996  |
| JP | 11-263681     | 9/1996  |
| WO | WO2004/085728 A1 | 10/2004 |

OTHER PUBLICATIONS

Mark Mathias et al., "Chapter 46, Diffusion media materials and characterisation", John Wiley & Sons, Ltd., 2003, pp. 1-21.

* cited by examiner

*Primary Examiner* — Barbara Gilliam
*Assistant Examiner* — Stephan Essex
(74) *Attorney, Agent, or Firm* — Quinn Law Group, PLLC

(57) ABSTRACT

Diffusion media for fuel cell is made by preparing an aqueous dispersion comprising a powder resin, a binder material, and a fiber material comprising carbon fibers, of these; forming a layer of the dispersion on a support; removing water from the layer to form a fiber layer; molding the fiber layer; and carbonizing or graphitizing the molded layer.

10 Claims, 4 Drawing Sheets

METHOD OF PREPARING GAS DIFFUSION MEDIA FOR A FUEL CELL

FIELD OF THE INVENTION

This disclosure relates to fuel cells with diffusion media. In particular, the disclosure relates to a method for making fuel cell diffusion media, diffusion media made by this method, and fuel cells containing such diffusion media.

BACKGROUND OF THE INVENTION

The statements in this section merely provide background information related to the present disclosure and may not constitute prior art.

Fuel cells are useful as a power source for electric vehicles and other applications. An exemplary fuel cell has a membrane electrode assembly (MEA) with catalytic electrodes and a proton exchange membrane (PEM) formed between the electrodes. Water is generated at the cathode electrode based on the electrochemical reactions between hydrogen and oxygen occurring within the MEA. Gas diffusion media plays an important role in PEM fuel cells. Generally disposed between catalytic electrodes and flow field channels that introduce reactant gases into the fuel cell, the gas diffusion media provide pathways for reactant to diffuse to the electrode and pathways for removal of the product water, electronic conductivity, and heat conductivity, as well as mechanical strength needed for proper functioning of the fuel cell.

During operation of the fuel cell, water is generated at the cathode based on electrochemical reactions involving hydrogen and oxygen occurring within the MEA. Efficient operation of a fuel cell depends on the ability to provide effective water management in the system. For example, the diffusion media prevent the electrodes from flooding (i.e., filling with water and severely restricting $O_2$ access) by removing product water away from the catalyst layer while maintaining reactant gas flow from gas flow channels of the bipolar plate through to the catalyst layer.

Fuel cell stacks can contain a large number of fuel cells depending on the power requirement of the application. For example, typical fuel stacks have up to 400 individual fuel cells and more. Because the fuel cells in the stacks operate in series, a weakness or poor performance in one cell can translate into poor performance of the entire stack. For this reason, it is desirable for every fuel cell in the stack to operate at high efficiency.

Typical manufacturing steps for gas diffusion media include manufacturing a carbon fiber paper, impregnating the paper with resin or a mixture of resin and fillers, molding the impregnated paper, and carbonization or graphitization of the resin-impregnated carbon fiber paper. The steps of manufacturing paper and impregnation are continuous, while the molding, carbonization and graphitization steps may be either batch or continuous.

Because typical fuel stacks contain so many individual fuel cells, it is important for the manufacturing process of the diffusion media to have a high degree of reliability. Improvements in the manufacturing process that reduce cost, simplify the process, or enhance performance of the media are thus desirable.

SUMMARY OF THE INVENTION

The invention provides a process for making a gas diffusion media in which (a) an aqueous dispersion comprising a fiber material and a resin powder is prepared, (b) the fiber and resin powder dispersion are formed into a layer or mat on a support, (c) water is removed from the layer to form a fiber layer including the resin powder, (d) the resin powder-containing fiber layer is molded, then (e) the molded layer is carbonized or graphitized. This method obviates a step of impregnating the fiber mat with a resin.

In an embodiment of the invention, the support is a screen having a desired mesh. Fiber strands and resin powder particles of a size larger than the holes of the mesh are retained to make the fiber layer, and smaller particles may also be retained in the fiber mat. In various embodiments, the screen has a mesh size smaller than the average particle size of the resin powder. In certain embodiment, a resin powder having an average particle size of from about 40 microns to about 100 microns is used.

In an embodiment of the process of the invention, the resin powder is or includes a phenolic resin.

In certain embodiments of the invention, the resin powder has an average particle size of from about 40 microns to about 100 microns.

The invention further provides a diffusion media prepared according to the method of the invention. The diffusion media has increased gas permeability compared to diffusion media having the same resin content but made by the prior art methods. While not wishing to be bound by theory, this is believed to be because the carbon or graphite fibers are spot welded together by the well-dispersed resin particles present during carbon paper formation as compared to solution impregnation method, which relies on resin flowing during curing to hold the individual fiber together. The traditional impregnation step results in a thin, resin-rich surface layer after resin impregnation and curing that is believed to be converted to an amorphous carbon surface layer on the individual fiber after carbonization/graphitization that can negatively impact the surface free energy and durability of the gas diffusion media. This surface layer on the carbon fibers is avoided by the present invention.

The invention also provides a fuel cell comprising a membrane-electrode assembly (MEA) comprising an anode, a cathode, and a proton exchange membrane (PEM) disposed between the anode and the cathode; on at least one of the cathode and the anode sides of the MEA, an impermeable, electrically conductive member that, together with the respective cathode and/or anode, defines a fluid distribution chamber between the impermeable, electrically conductive member and the cathode and/or anode, respectively; and a diffusion media according to the invention disposed in one or both of the fluid distribution chambers. The diffusion media preferably spans the fluid distribution chamber from the impermeable, electrically conductive member side to the electrode side.

The new carbon fiber paper making steps of the process reduce the cost of making the carbon fiber paper gas diffusion media and, consequently, the cost of fuel cell prepared using the gas diffusion media of the invention. In addition, the diffusion media prepared by the process of the invention exhibit a more open pore structure and improved fuel cell performance.

In the discussion of the invention, "resin" includes both oligomeric and polymeric materials that are suitable for the particular application. "Powder" refers to comminuted, ground, or granulated material. "About" has its customary meaning of "nearly" or that there may be some slight imprecision in the value (approximately or reasonably close to the value). Numerical ranges are to be understood as disclosing the endpoint values and each value within the range, as well as all included ranges that may be formed by taking any two disclosed values as endpoints.

DETAILED DESCRIPTION

Further areas of applicability will become apparent from this description. It should be understood that the description, drawings, and specific examples are intended for purposes of illustration only and are not intended to limit the scope of the present disclosure.

A gas diffusion media is made with fiber and a powder resin. The powder resin is not solvated when incorporated into the gas diffusion media precursor. The powder resin is incorporated in its powder form, and may be melted and may be at least partially cured before being carbonized or graphitized to form the gas diffusion media from the gas diffusion media precursor.

Figure 1:
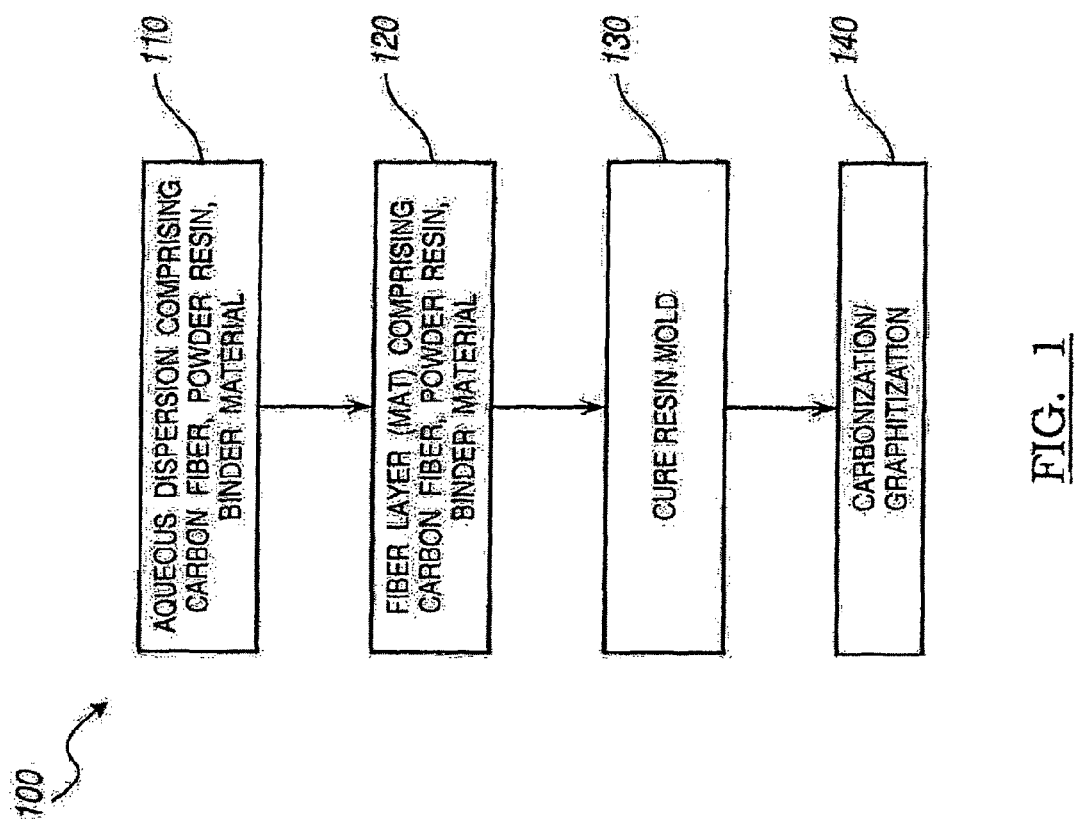
FIG. 1 is a flow diagram of a process of the invention.

FIG. 1 shows a process 100 of the invention for making a gas diffusion media. In step 110, a dispersion of carbon and/or graphite fiber, powder resin, and a binder material is formed. In certain embodiments, the dispersion includes carbon fiber obtained by carbonizing polyacrylonitrile fibers that are then chopped into desired lengths. In various embodiments, the carbon fibers have a diameter of from about 5 to about 10 microns and a length of from about 5 mm to about 10 mm. Graphite fibers may also be used.

Suitable examples of carbon or graphite fibers include, without limitation, carbonized or graphitized fibers of polyacrylonitrile, copolymers of acrylonitrile (especially those comprising at least 90% by weight of the acrylonitrile monomer), cellulose, rayon, pitch, and phenolics.

Polyacrylonitrile (PAN) fibers are usually made from the PAN polymer using a solvent spinning process. Filaments having a diameter of 12 to 14 microns are typically used to prepare the carbon or graphite fibers for fuel cell diffusion media. The PAN fiber may be stabilized in air at about 230° C., then carbonized and chopped to desired lengths. Carbonization may be carried out at about 1200 to 1350° C. in nitrogen to yield a carbon fiber with at least 95% by weight carbon content. The carbonized tows may be chopped into lengths of about 3 to about 12 mm.

In one method, the carbon and/or graphite chopped fiber is then mixed with water, the powder resin, and a binder material to form an aqueous dispersion. A binder material is preferably used to impart structural integrity to the carbon fiber paper that will be made from the dispersion so that the paper can be further processed without damage. Suitable examples of binder materials include, without limitation, poly(vinyl alcohol) (PVA), poly(vinyl pyrrolidone) (PVP), and other such water-dispersible polymers.

The powder resin may be any carbonaceous resin or powder. Suitable examples include, without limitation, phenolic resins, amino resins such as melamine resins and urea resins, epoxy resins, furan resins, acrylic polymers, phenoxy resins, epoxy-modified polyimide resins, unsaturated polyester resins, polyimide resins, polyurethanes, diallylphthalate resins, maleimide resins, fluorocarbon polymers such as Teflon, cyanate resins, and combinations of these and/or other polymers or resins. In certain embodiments, powder resin is thermosettable, whether self-crosslinking, formulated with a crosslinker, or oxidatively curing. In a particular embodiment, the powder resin comprises a phenolic resin. Phenolic resins are preferred due to their high carbon yield (50% of initial weight) and low cost, although other resins are feasible. The resin selected should be a solid at the temperature at which the dispersion is formed, not soluble in water, and is used in powdered form. In certain embodiments it is desirable to use a powder resin having an average particle size of from about 40 microns to about 100 microns. When the dispersion is formed into a layer on a mesh screen, water and some powder resin particles having a size smaller than the mesh of the screen pass through the screen. Fiber and resin powder particles of a size larger than the mesh holes are retained to make the fiber layer. Particles smaller than the screen mesh may also be trapped in the fiber layer. The screen has a mesh size smaller than the average particle size of the resin powder. For example, a screen with 300 mesh to 100 mesh may be selected.

The dispersion may contain from about 40 to 80 percent by weight resin powder, preferably from about 60 to about 75 percent by weight resin powder, based on the combined weights of resin powder and carbon fiber and/or graphite fiber.

When the dispersion includes a binder material, the dispersion may be formed into a layer or mat or paper using papermaking techniques. The dispersion may be formed into a carbon-fiber paper filled with the powder resin using a wet-laid process and conventional papermaking equipment. In such a process, the dispersion is fed into a "headbox" that drops the dispersion into a rotating, porous drum or wire screen with a vacuum dryer to remove the water. The web formed is pulled off the drum or screen and fully dried, usually in an oven or on hot, large diameter, rotating drums.

In conventional processes for making diffusion media, the papermaking or mat making process must be followed by an impregnation step in which a resin in organic solvent is introduced into the carbon fiber matrix. The present invention does not require this step, as the carbon fiber paper or mat is formed with the powder resin already dispersed throughout it. This avoids substantial time, cost, emissions, and equipment as compared to the conventional processes.

The carbon fiber paper or mat containing powder resin is then heated in an oxygen atmosphere to at least partially cure the resin (called B-staging). The degree of polymerization after B-staging is sufficient so that there is very little resin flow during a molding step that follows. Because the dispersion contains the powder resin, the drying step and the B-staging step may be combined in a single process step.

After the B-staging, the particle resin-doped paper or mat may be molded continuously or die cut into discrete sheets of up to about a square meter for the molding step that follows. The particle resin-doped paper or mat is molded to a desired thickness and conformation in step 130, then carbonized or graphitized in step 140 to provide the gas diffusion media. Generally, the binder material is completely burned off during the carbonization and graphitization step.

The B-staging step may also be incorporated into the mold step. In this embodiment, the carbon fiber paper or mat containing powder resin is molded with controlled temperature ramping profile to fully cure the resin.

In step 130 of the process shown in FIG. 1, the particle resin-doped carbon fiber paper or mat is compression molded and fully cured by heating under pressure. The optimum temperature and pressure depends, for example, on the particular powder resin selected. A typical phenolic resin, for instance, may be fully cured at or above about 175° C. under a pressure of about 400-550 kPa. For batch processes, the papers or mats (as previously cut) are stacked up with silicone-coated separator papers between them at desired intervals to provide the desired plies in the molded product(s). The stack can be molded at a given pressure or thickness to achieve the desired thickness or density for the molded papers. Following molding, a post-cure (the "C-staging") may be performed at an elevated temperature (e.g., at or higher than 200° C.) in air to ensure full curing or crosslinking of the resin before the next step of carbonization.

Continuing then to step 140, the molded paper or mat is carbonized or graphitized. Graphitization occurs when the mat is heated at over 2000° C. in an oxygen-free environment, causing changes in fiber physical structure. Amorphous carbon is changed to crystalline lamellar graphite, resulting in higher tensile modulus, increased electrical and thermal conductivity, and higher density and chemical resistance compared to amorphous carbon fiber. The resin-portion of the composite does not graphitize, but remains as amorphous carbon.

Carbonization and graphitization may be carried out continuously or by stacking sheets in a horizontal or vertical batch furnace. The stacks are heated in an inert atmosphere (e.g., nitrogen or argon). It is preferred to carbonize (temperature 1200-2000° C.) then graphitize (temperature >2000° C.) the composite in the same furnace in a continuous cycle.

Figure 2B:
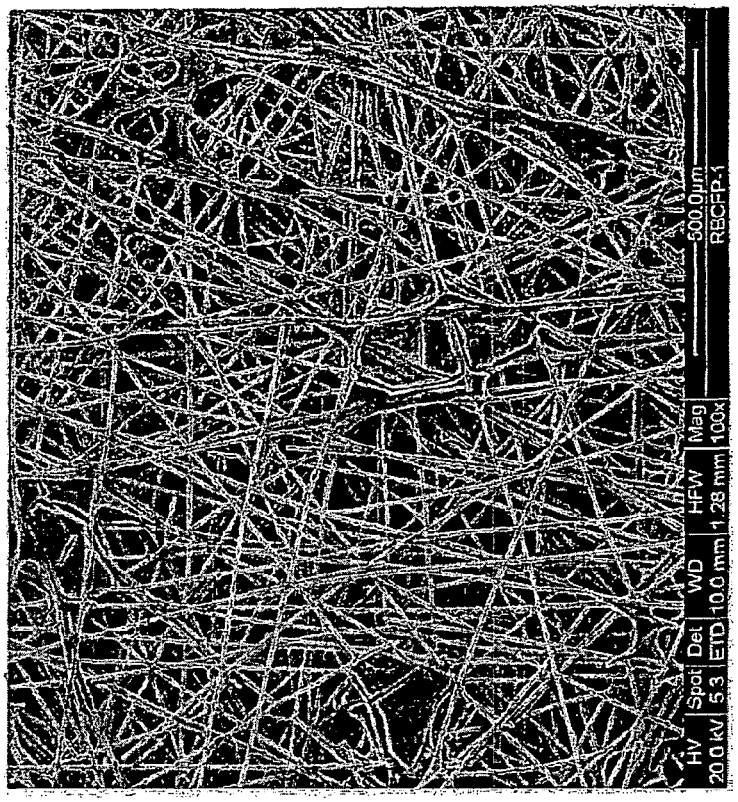
FIGS. 2a and 2b are reproductions of SEM images of carbon fiber paper prepared by conventional solution resin impregnation method (FIG. 2a) and by the powder resin doping process of the invention (FIG. 2b)
Figure 2A:
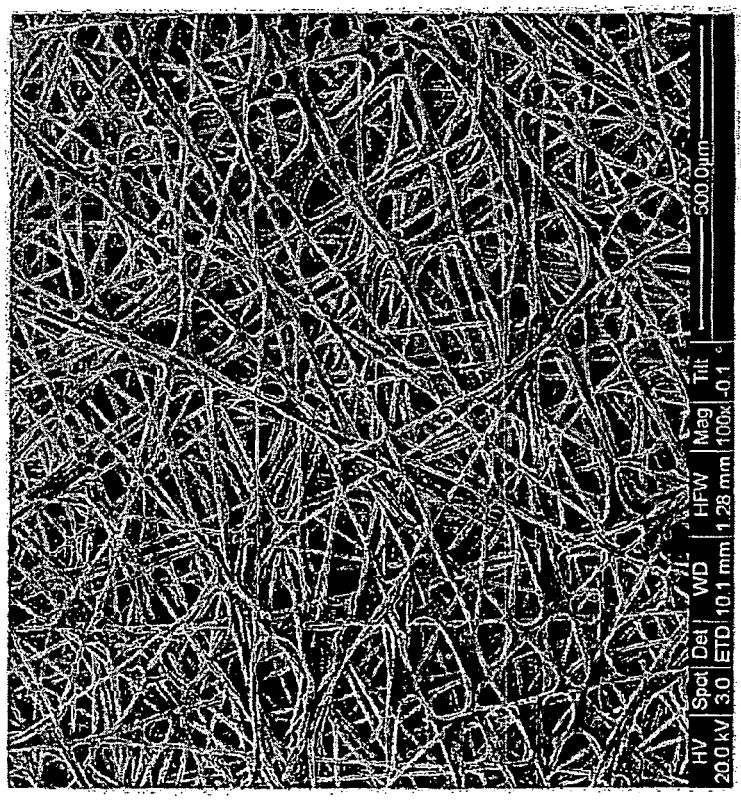

FIGS. 2a and 2b are reproductions of SEM images of carbon fiber paper prepared by conventional solution resin impregnation method (FIG. 2a) and by the powder resin doping process of the invention (FIG. 2b). As can be seen, the process of the invention provides a more open, homogenous structure. Further, the conventional resin solution impregnation process is believed to leave a thin, carbonized resin film layer on the surface of the individual fiber. This amorphous surface layer is avoided in the process of the invention, and a substantial portion of the original carbon fiber surface is left exposed, while the prior art products made by solution impregnation of fiber paper provide fiber completely or nearly completely coated with amorphous carbon film. Exposure of the carbon fiber surface improves conductivity, both thermal and electrical, and surface energy over the prior art amorphous carbon film coated products.

In various embodiments, diffusion media of the invention are provided with a surface coating to enhance water transportation though the diffusion media. Nonlimiting examples of diffusion media treatments include poly(tetrafluoroethylene) (PTFE) treatment and a microporous layer (MPL) coating which contains a mixture of carbon powders and fluoropolymers. In one embodiment, a microporous layer is formed by coating the diffusion media with a paste containing carbon black (e.g., acetylene black) and PTFE dispersion and sintering the diffusion media with the paste.

The diffusion media is used to make a fuel cell. Fuel cell stacks contain a plurality of fuel cells, the number of individual cells depending on the power and voltage requirements of the application. In automotive use, typical fuel cell stacks contain 50 or more individual fuel cells and can contain up to 400, 500, or even more. Power requirements in various applications can also be met by providing a number of modules comprising individual fuel cell stacks. The modules are designed to work in a series to provide adequate power and are sized to fit within the available packaging.

Figure 3:
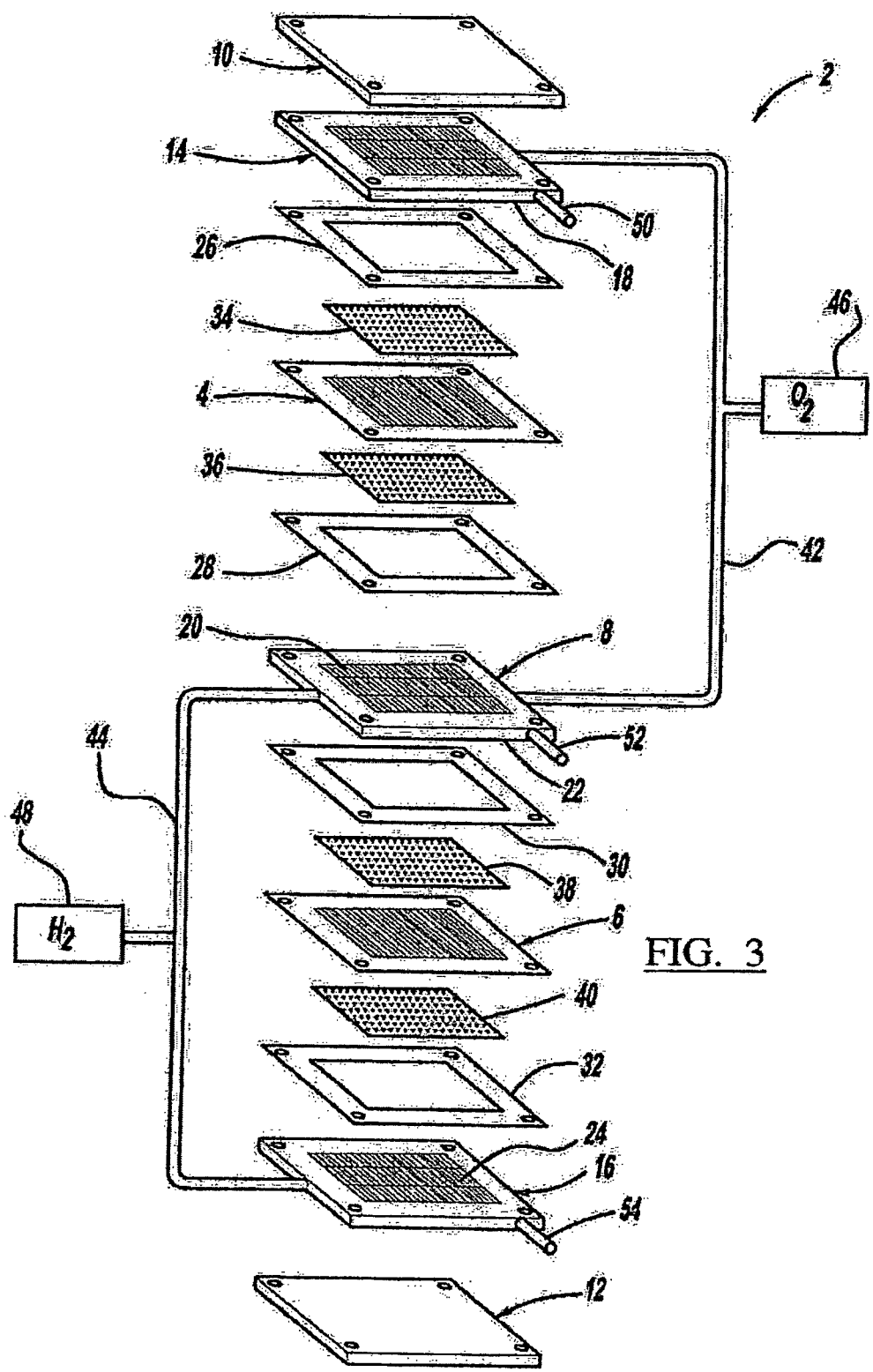
FIG. 3 is a schematic diagram of a fuel cell stack including gas diffusion media.

FIG. 3 is an expanded view showing some details of the construction of a typical multi-cell stack, showing just two cells for clarity. The bipolar fuel cell stack 2 has a pair of membrane electrode assemblies (MEA) 4 and 6 separated from each other by an electrically conductive fuel distribution element 8, hereinafter bipolar plate 8. The MEAs 4 and 6 and bipolar plate 8 are stacked together between stainless steel clamping plates or end plates 10 and 12 and end contact elements 14 and 16. The end contact elements 14 and 16, as well as both working faces of the bipolar plate 8, contain a flow field of a plurality of grooves or channels 18, 20, 22, and 24 respectively, for distributing fuel and oxidant gases (i.e. hydrogen and oxygen) to the MEAs 4 and 6. Non-conductive gaskets 26, 28, 30, and 32 provide seals and electrical insulation between several components of the fuel cell stack. Gas diffusion media of the invention 34, 36, 38, and 40 press up against the electrode faces of the MEAs 4 and 6. The end contact elements 14 and 16 press up against diffusion media 34 and 40 respectively, while the bipolar plate 8 presses up against diffusion media 36 on the anode face of MEA 4, and against diffusion media 38 on the cathode face of MEA 6. Oxygen is supplied to the cathode side of the fuel cell stack from a storage tank 46 by appropriate supply plumbing 42, while hydrogen is supplied to the anode side of the fuel cell from storage tank 48, by appropriate supply plumbing 44. Alternatively, ambient air may be supplied (e.g., from a compressor or blower) to the cathode side as an oxygen source and hydrogen may be supplied to the anode from a methanol or gasoline reformer. Exhaust plumbing (not shown) for both the hydrogen and oxygen sides of the MEAs 4 and 6 will also be provided. Additional plumbing 50, 52, and 54 is provided for supplying liquid coolant to the bipolar plate 8 and end plates 14 and 16. Appropriate plumbing for exhausting coolant from the coolant bipolar plate 8 and end plate 14 and 16 is also provided, but not shown.

Individual fuel cells contain a proton exchange membrane disposed between electrodes. The electrodes are an anode and a cathode for use in carrying out the overall production of water from fuel containing hydrogen and an oxidant gas containing oxygen. In various embodiments, the electrodes contain carbon support particles on which smaller catalyst particles (such as platinum) are disposed as well as a polymer electrolyte that serves to bind and conduct protons within the electrode layers. Suitable electrodes are commercially available, and the cathode and anode may be made from the same materials. The electrodes contact a porous and electrically conductive material such as carbon cloth or carbon paper that serves as the diffusion media.

Figure 4:
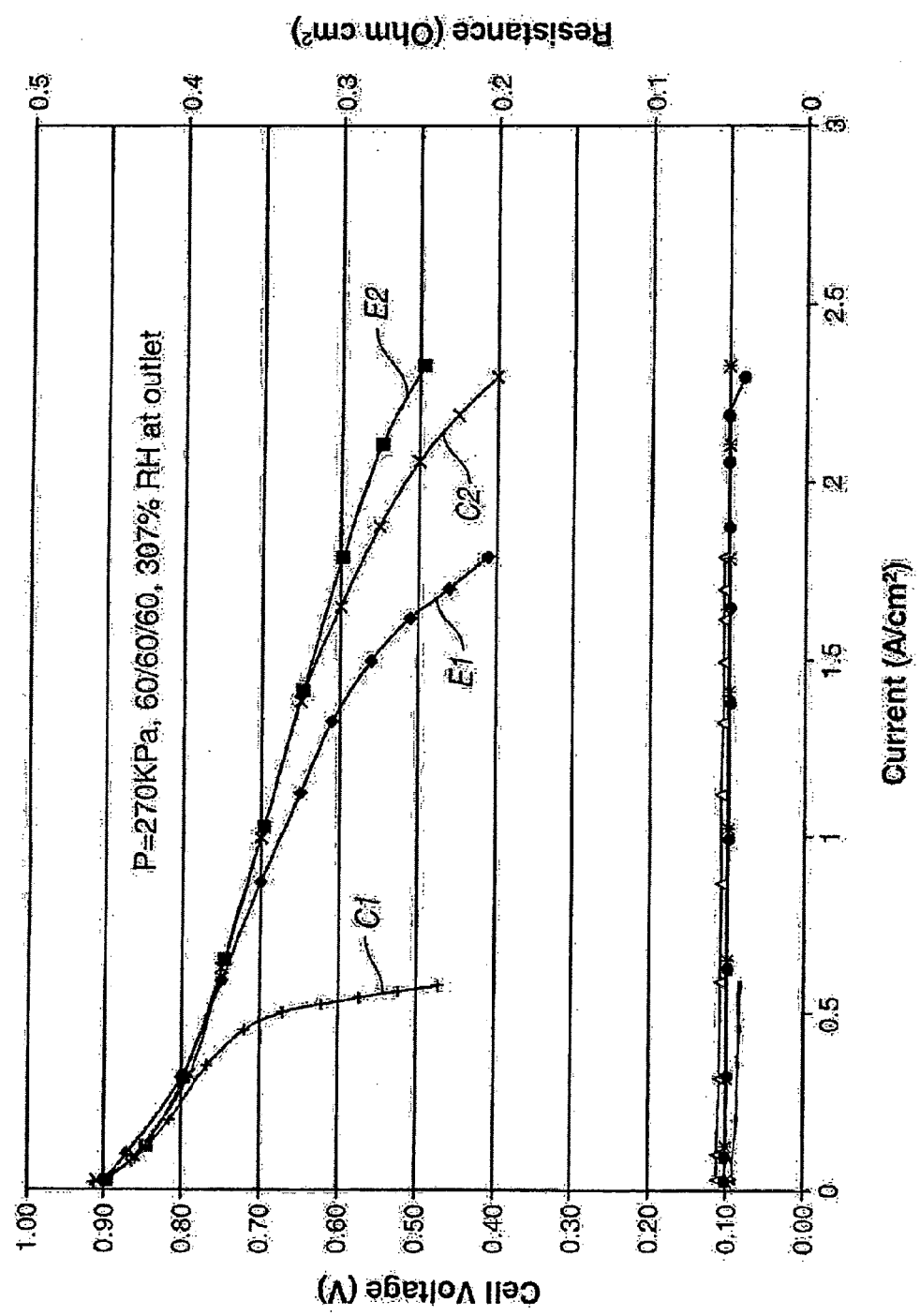
FIG. 4 shows comparative current voltage curves of treated diffusion media.

FIG. 4 shows test data from 50 cm$^2$ single fuel cells. In all cases, the diffusion media of the present invention and reference diffusion media were employed on the cathode side of the fuel cell, where the water management requirements of the diffusion media are most severe. A conventional diffusion media (Toray TGP H-060) treated with 7 weight percent poly(tetrafluoroethylene) was employed as the anode diffusion media. The fuel cell performance testing was done at an absolute pressure of 270 kilopascals (kPa), a cell temperature of 60° C. with both the anode and cathode dew points at 60° C., anode flow of hydrogen at two times the stoichiometric requirement based on current draw, and cathode flow of air at two times stoichiometric requirement, which results in about 307% relative humidity (RH) at the gas outlet. This test compares effectiveness of liquid water management capability for the tested diffusion media employed on the cathode side of the cell. Comparative curve C1 plots current versus cell voltage for Toray 060 carbon fiber paper treated with 7 wt % PTFE. Comparative curve C2 shows the result for Toray 060 carbon fiber paper but coated with a microporous layer (MPL) coating at about 1.1 mg/cm², which was positioned against the catalyst layer. The MPL coating was prepared by rod coating a paste onto the carbon fiber paper. The paste contained 2.4 grams acetylene black, 1.33 grams of a 60% PTFE dispersion, 31.5 ml isopropanol, and 37 ml deionized water. Then the carbon paper with the paste is sintered by heating at 380° C. for 20 minutes. Invention curves E1 and E2 show current versus cell voltage for a carbon fiber paper prepared according to the invention using Sigrafil C-30 carbon fibers and 120 mesh Rutger-Plenco 12114 resin powder. This resin-bonded carbon fiber paper contains about 66 wt % resin before carbonization. The weight ratio of carbon fiber to carbonized resin is about 1:1 after carbonization. The Example of E1 is PTFE-treated (7 wt. %) and the Example of E2 is PTFE-treated (7 wt. %) with an additional MPL coating that was positioned against the catalyst layer. The MPL coating was prepared as before, with a loading of 1.15 mg/cm² solids on the substrate.

The curves of FIG. 4 show that the examples E1 and E2 of diffusion media of the invention provide significantly improved water management effectiveness over the Toray diffusion media under high humidity conditions. Additional testing was also performed under fairly dry operating conditions, with no performance difference observed between the invention sample and the reference sample.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of preparing diffusion media, the method consisting essentially of:
    preparing an aqueous dispersion comprising:
        a powder resin having an average particle size of from about 40 microns to about 100 microns;
        a binder material; and
        a fiber material comprising a plurality of carbon fibers, a plurality of graphite fibers, or combinations thereof, wherein the aqueous dispersion comprises from about 60 percent by weight to about 75 percent by weight powder resin, based on a combined weight of the powder resin and the fiber material;
    forming a layer of the aqueous dispersion on a support;
    removing water from the layer to form a fiber layer;
    during or after removing water, heating the fiber layer to at least partially cure the powder resin to a partial degree of polymerization;
    after heating, compression molding the fiber layer with heat under pressure to fully cure the powder resin to a full degree of polymerization that is greater than the partial degree of polymerization and form a pressure-molded layer, wherein compression molding includes welding the plurality of carbon fibers, the plurality of graphite fibers, or combinations thereof to one another without flowing the powder resin through the fiber layer;
    after compression molding, optionally post-curing the powder resin to ensure full crosslinking of the powder resin; and
    after compression molding, carbonizing or graphitizing the pressure-molded layer.

2. A method according to claim 1, wherein at least partially curing the resin is concurrent to removing water.

3. A method according to claim 1, wherein the powder resin comprises a phenolic resin.

4. A method according to claim 1, wherein the support is a screen.

5. A method according to claim 4, wherein the powder resin has an average particle size, and further wherein the screen has a mesh size that is smaller than the average particle size.

6. A method according to claim 1, wherein compression molding includes further heating the fiber layer and applying a pressure of from about 400 kPa to about 550 kPa to the fiber layer.

7. A method according to claim 1, wherein preparing includes substantially homogeneously dispersing the powder resin within the fiber material.

8. A method according to claim 1, wherein removing water includes dispersing the powder resin within the fiber material so that the plurality of carbon fibers, the plurality of graphite fibers, or combinations thereof bind to one another during heating.

9. A method according to claim 1, wherein heating includes welding the plurality of carbon fibers, the plurality of graphite fibers, or combinations thereof to one another with the powder resin.

10. A method according to claim 1, wherein each of the plurality of carbon fibers and each of the plurality of graphite fibers has a respective surface, and further wherein carbonizing or graphitizing includes further heating the pressure-molded layer in an inert atmosphere so that the respective surface is substantially free from a film layer formed from amorphous carbon.

* * * * *